United States Patent [19]

Payne

[11] Patent Number: 4,531,462
[45] Date of Patent: * Jul. 30, 1985

[54] BIOMASS GASIFIER COMBUSTOR

[75] Inventor: Frederick A. Payne, Clemson, S.C.

[73] Assignee: University of Kentucky Research Foundation, Lexington, Ky.

[*] Notice: The portion of the term of this patent subsequent to Sep. 28, 1999 has been disclaimed.

[21] Appl. No.: 584,302

[22] Filed: Mar. 5, 1984

Related U.S. Application Data

[63] Continuation of Ser. No. 350,412, Feb. 19, 1982, abandoned, which is a continuation of Ser. No. 113,339, Jan. 18, 1980, Pat. No. 4,334,484.

[51] Int. Cl.³ ............................ F23B 5/00; F23K 3/00
[52] U.S. Cl. ............................ 110/210; 110/101 CD; 110/214; 110/225
[58] Field of Search ................ 110/101 CD, 203–205, 110/210, 214, 225, 327

[56] References Cited

U.S. PATENT DOCUMENTS

| | | | |
|---|---|---|---|
| 2,032,402 | 3/1936 | Colby et al. | 110/220 |
| 2,506,782 | 5/1950 | Fallon | 110/101 CD |
| 3,201,329 | 8/1965 | Burt | 110/327 |
| 3,453,976 | 7/1969 | Burden, Jr. et al. | 110/222 |
| 3,610,179 | 10/1971 | Shaw, Jr. | 110/214 |
| 3,747,542 | 7/1973 | Ruohola et al. | 110/214 |
| 3,774,555 | 11/1973 | Turner | 110/210 |
| 3,792,671 | 2/1974 | Woods | 110/348 |
| 3,822,657 | 7/1974 | Midkiff | 110/101 CD |
| 3,861,334 | 1/1975 | Stockman | 110/204 |
| 4,013,023 | 3/1977 | Lombana et al. | 110/225 |
| 4,027,602 | 6/1977 | Mott | 110/203 |
| 4,038,032 | 7/1977 | Brewer et al. | 110/212 |
| 4,123,979 | 11/1978 | Tesch | 110/214 |
| 4,334,484 | 6/1982 | Payne | 110/210 |

Primary Examiner—Henry C. Yuen
Attorney, Agent, or Firm—Birch, Stewart Kolasch & Birch

[57] ABSTRACT

The present invention is directed to a biomass gasifier combustor which operates by gasification and combustion of the biomass to produce a clean effluent gas which can be used directly for grain drying or other applications where thermal energy is required. The biomass gasifier combustor burns crop residue clean enough so that the combustion gases can be used directly for grain drying without the need for a heat exchanger to isolate the combustion gases from the drying air. The biomass gasifier combustor includes a screw feeder tube having a screw feeder disposed therein. The screw feeder forces the biomass into a first combustion chamber. Primary combustion of the biomass produces a first combustion gas. A venturi gas pump creates a negative pressure region in the gasifier, drawing the first combustion gas into a second combustion chamber. An air passage is provided having a cross sectional area which increases the resistance to the flow of the first combustion gas into the second gas combustion chamber. A secondary combustion takes place, completely oxidizing the organics in the primary combustion gas and producing a clean exhaust gas which can be used directly for grain or other drying purposes. An improved first chamber includes a manifold section for preventing the biomass from escaping into the secondary combustion chamber, and a variable height grate for allowing the ash product to fall through the holes in the variable height grate. A damper may be provided at the air inlets to control the flow rate of secondary air. A damper may be placed on the exhaust eductor or venturi pump for regulating the thermal output of the system. The level of biomass in the first combustion chamber may also be monitored and automatically controlled.

5 Claims, 10 Drawing Figures

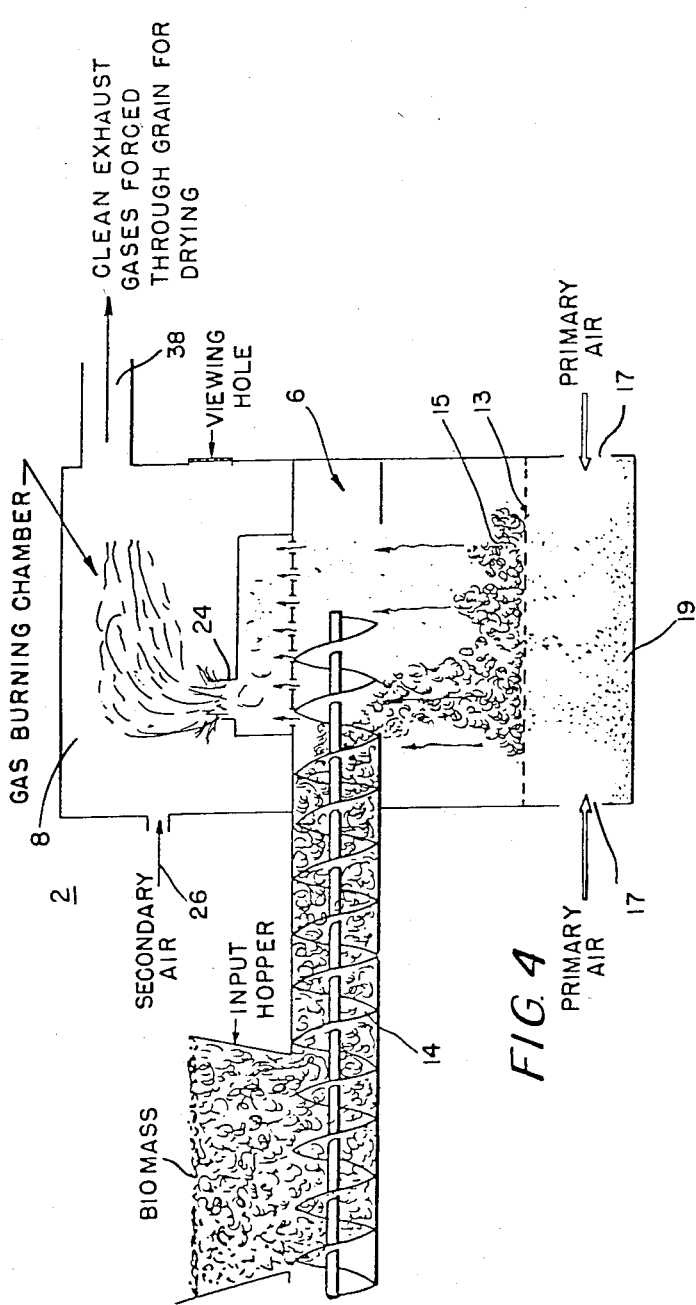
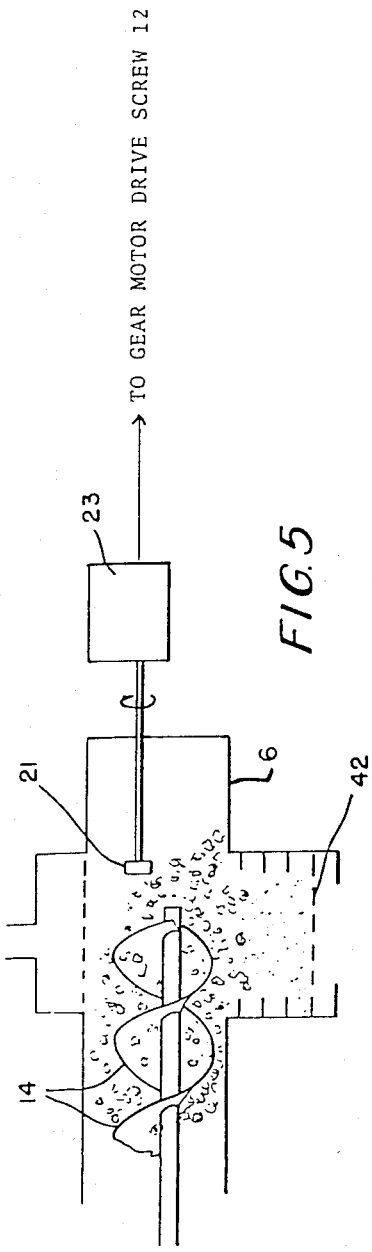
FIG. 4
FIG. 5

BIOMASS GASIFIER COMBUSTOR

BACKGROUND OF THE INVENTION

1. Field of the Invention

This application is a continuation of application Ser. No. 350,412 filed Feb. 19, 1982, now abandoned, which is a continuation of application Ser. No. 113,339 filed Jan. 18, 1980, now U.S. Pat. 4,334,484, and relates to a biomass gasifier combustor for burning crop residue and more specifically to a biomass gasification process for producing clean combustion gas to be used for grain drying or other applications where thermal energy is required.

2. Description of the Prior Art

In the prior art, it was required to use a heat exchanger to isolate the combustion gases from the drying air so that the drying air could then be used for grain drying or other applications where thermal energy is required. This prior art heat exchanger was required because the combustion gases contained excessive particulate matter and unburned combustibles. The presence of this particulate matter and unburned combustibles in the gases eliminated the possible use of these combustion gases for grain drying purposes. Consequently, the heat exchanger was required in order to produce a clean flow of drying air.

SUMMARY OF THE INVENTION

It is, therefore, an object of the present invention to provide a biomass gasifier combustor which will overcome the above noted and other disadvantages.

Another object of the present invention is to provide a biomass gasifier combustor which burns crop residue or other biomasses clean enough so that the combustion gases can be used directly for grain drying purposes without the need for a heat exchanger to isolate the combustion gases from the drying air.

Still another object of the present invention is to provide a biomass gasifier combustor which includes a screw feeder tube and a screw feeder disposed therein, the screw feeder tube being disposed horizontally to provide a mechanical force for forcing the biomass into a horizontally disposed gasification chamber thereby not relying on gravity to feed the gasifier.

A further object of the present invention is to provide a biomass gasifier combustor which includes a screw feeder tube, and a screw feeder disposed therein which provides for a partial seal at the feed end of the gasifier.

Yet, another object of the present invention is to provide a biomass gasifier combustor having an improved gasification chamber which permits controlled combustion of the biomass and allows the rate of burning to be adjusted to the required output.

Still a further object of the present invention is to provide a biomass gasifier combustor which operates properly under conditions of low gasification rates and a positive bouyant force in the gasifier.

These and other objects of the present invention are accomplished by providing a gasifier combustor wherein the biomass is forced into the gasification chamber by a screw feeder. The gasification chamber does not require a mechanical seal since the screw feeder tube together with the screw feeder functions as a partial seal at the feed end of the gasifier. In addition, the biomass is horizontally forced into the fire zone by a mechanical force instead of the conventional gravity feed. As a result, the biomass is gasified (undergoes a primary combustion) in the gasification chamber without excessive compaction by gravity and loss of porosity. A venturi pump is provided which creates a negative pressure region within the entire system. Primary air is drawn through and passes through the fire zone generating a gas which is exhausted into the secondary combustion chamber as a low BTU gas where it undergoes a secondary combustion. Consequently, the gasifier combustor of the present invention produces a clean combustion gas (exhaust) which can be used directly for grain drying purposes without the need to resort to the use of a heat exchanger for isolating the combustion gases from the drying air. The pressure drop across the gasifier from the primary air inlet to the gasifier to the gas inlet to the secondary combustion chamber, is always maintained positive by increasing the orifice passage resistance of the existing gas by decreasing the orifice size of the gas exit area between the gasifier and secondary combustion chamber thus permitting sufficient secondary air to be pulled into the secondary combustion chamber for a wide range of gasification rates. Thus, when burning occurs at a very low gasification rate and the pressure drop across the gasifier would normally become negative because the bouyant pressure generated in the gasifier surpasses, in magnitude, the pressure loss due to flow resistance within the gasifier, the reduced size of the orifice compensates and develops the necessary positive pressure drop.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1A is a simplified perspective view of the damper for the secondary air inlet;

FIG. 1B is a larger view of the pressure blower of FIG. 1 having a damper thereon;

FIG. 4 is a schematic view of the operation of the biomass gasifier combustor of FIG. 1;

FIG. 5 is a sectional view of an automatic controller in controlling biomass feeding into the gasification chamber of FIG. 1;

DETAILED DESCRIPTION OF THE INVENTION

Figure 1:
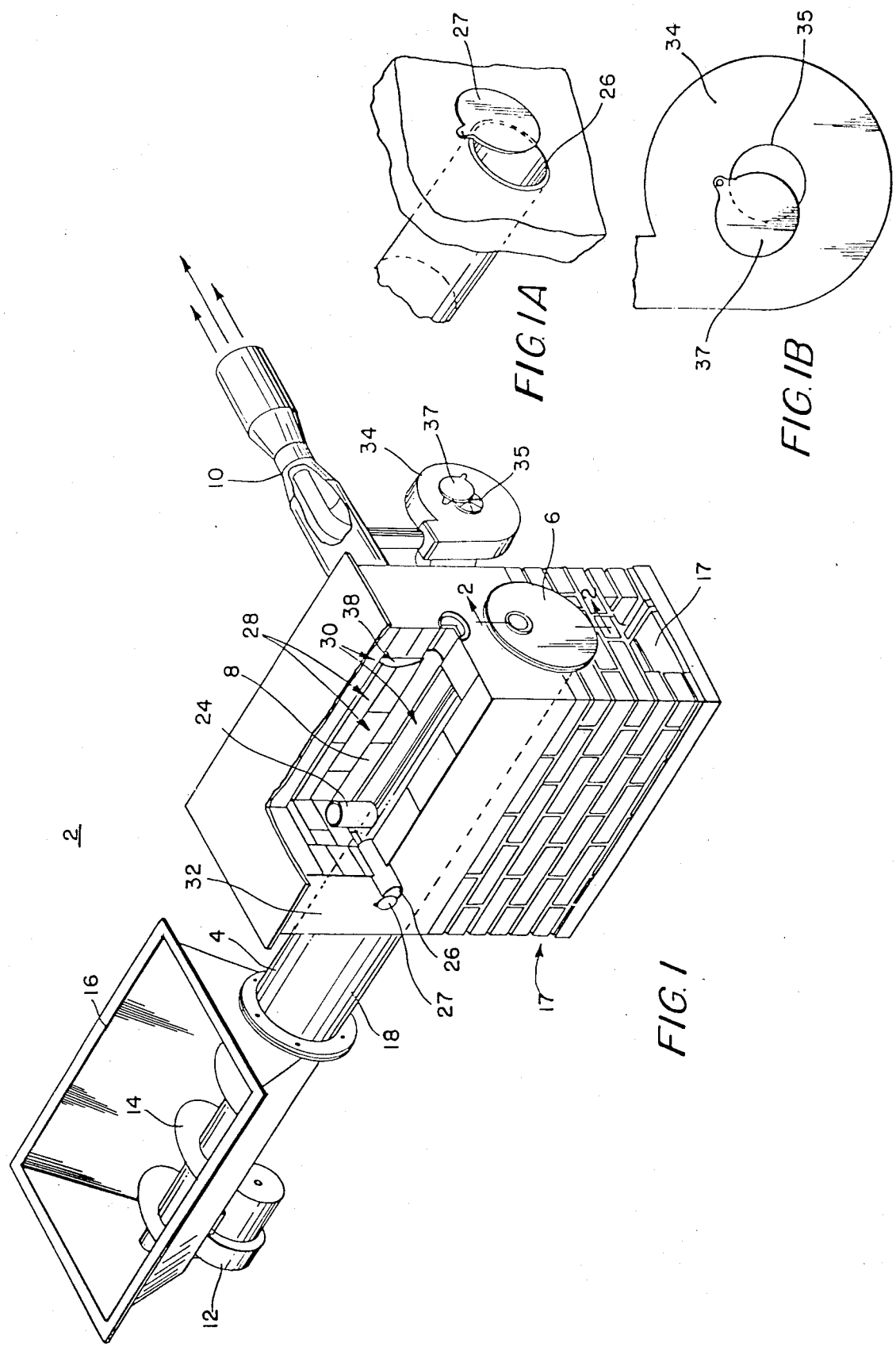
FIG. 1 is a perspective view of the biomass gasifier combustor of the present invention illustrating the biomass feeder including the screw feeder, the gasification chamber, the gas combustion chamber, and the venturi gas pump creating the negative pressure region.

Referring to FIG. 1, a biomass gasifier combustor 2 is shown which includes a biomass feeder 4 integrally connected to a gasification chamber 6. The gasification chamber 6 communicates with the gas combustion chamber 8. The gas combustion chamber 8 further communicates with a venturi gas pump 10. The venturi gas pump 10 creates a negative pressure region within the combustor 2. The biomass feeder 4 includes a gear motor drive screw 12 which rotatably drives a screw feeder 14 disposed within a hopper 16. The screw feeder 14 rotates through a feeder tube 18. As the screw feeder 14 rotates, the blades of the screw feeder 14 travel through the feeder tube 18 and into the gasification chamber 6.

Figure 2:
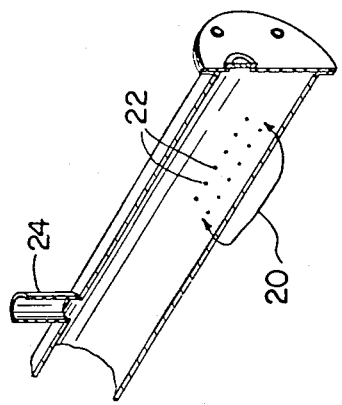
FIG. 2 is a perspective view of the gasification chamber taken along section lines 2—2 of FIG. 1.

Referring to FIG. 2, there is shown a sectional view of the gasification chamber 6, shown in a half-section. The gasification chamber 6 includes an area generally denoted as a fire zone 20. The gasification chamber 6 further includes a plurality of holes 22 utilized as an air entrance for primary air communicating with the fire zone 20. A gas exit tube 24 is disposed on a top portion of the gasification chamber, communicating with the fire zone 20 on one end and with the gas combustion chamber 8 on the other end having a reduced cross sectional area so as to develop a positive pressure drop between the gasifier 6 and the secondary combustion chamber 8.

Figure 3:
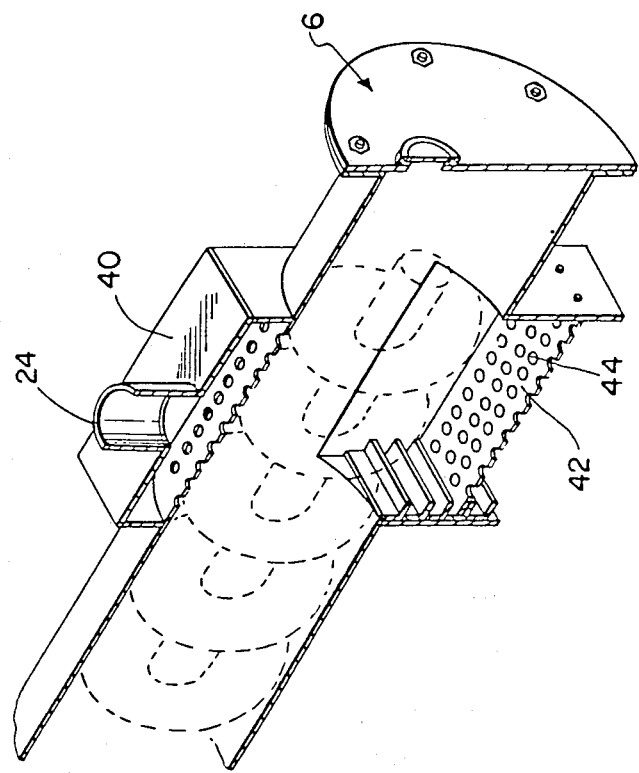
FIG. 3 is a perspective view of an alternate embodiment of the gasification chamber of the present invention.

Referring now to FIG. 3, another embodiment of the present invention is shown which includes an improved modification to the gasification chamber 6 of FIG. 1. The gasification chamber 6 in FIG. 3 includes a manifold section 40 for preventing large pieces of the biomass from being carried into the gas combustion chamber 8. This gasification chamber 6 in FIG. 3 also includes a variable height grate 42. The variable height grate creates a larger volume in the fire zone and is not disrupted by the turning of the screw feeder 14. The ash, which is the product of the primary combustion of the biomass in the gasification chamber 6, falls through the holes 44 in the variable height grate. The screw feeder 14 runs the entire length of the fire zone 20 inside the gasification chamber 6 to spread the biomass over the entire fire zone area. Exit chamber 24 having a reduced diameter directs the gasified gases to the combustion chamber.

Referring once again to FIG. 1, positioned below the gasification chamber 6 are primary air inlet openings 17. Primary air is drawn through openings 17 in response to the negative pressure region created by the venturi gas pump 10. As combustion gases are created in the gasification chamber 6, these gases exit through the gas exit tube 24 and into the gas combustion chamber 8. The purpose of the gas (or secondary) combustion chamber 8 is to provide an insulated chamber with sufficient oxygen, temperature, residence time and turbulence to completely oxidize the organics to $CO_2$ and $H_2O$. The gas combustion chamber 8 includes a secondary air inlet 26 which permits the flow of air through the air inlet 26 to the gas combustion chamber 8 once again drawn in response to the venturi gas pump 10. Covering the secondary air inlet 26, a damper 27 is rotatably engaged thereto to meter the proportion of secondary air being drawn thru the secondary air inlet 26 and into the secondary combustion chamber. See FIG. 1A. The damper 27 can be rotated to cover all or a portion of the air inlet opening of the secondary air inlet 26. The ratio of the secondary air to the primary air entering the system is thus controlled by the damper 27. The system is designed such that there is a tendency to pull in excess secondary air. Thus a damper is required on the secondary air inlet only to reduce the amount of secondary air to the desired level. The amount of secondary air may be increased to a level where no smoke is evident in the exhaust. Typically, between 50–200% excess air is used.

When burning at a very low gasification rate is such that a differential pressure across the gasifier of the present system becomes negative, this indicates that bouyant forces developed within are creating a positive pressure within the gasifier and the gasifier thus tends to produce gas at a rate determined by these bouyant forces and not by the pull of the venturi pump. To eliminate this problem the gas exit area herein 24 between the gasifier and the secondary combustion chamber is reduced to create a resistance or pressure drop across the orifice passage which is greater than the pressure loss across the secondary air inlet 26 and damper 27. The sum of the resistance across the gasifier and orifice passage is still controlled to be less than the air resistance across the damper and secondary air inlet. Thus, by increasing the orifice passage resistance even at low gasification rates there will always be excess air being drawn in the secondary air inlet and always a need for closing the damper. As a result of controlling the orifice size in the manner described above, hot gases can always be pulled from a system of the nature herein defined without having to mechanically control two of the three flows (primary air flow, secondary air flow, or exhaust) with a fan or blower. Using two blowers would complicate the controls and modulation.

The gas combustion chamber 8 also includes insulating fire brick 28 and a castable insulating refractory 30. A sheet metal enclosure 32 encloses the entire gas combustion chamber around the outer portion thereof. The primary air is drawn through openings 17 and the hot glowing coals 15 as a result of the negative pressure region created by the venturi pump 10 shown in FIG. 1. The venturi gas pump 10 includes a pressure blower 34 for providing the forced air necessary to create the negative pressure region within the combustor 2.

Referring to FIG. 1B, the pressure blower 34 is shown. The blower 34 includes a fan inlet 35 for allowing air to enter the blower 34. Covering the fan inlet 35 is a damper 37. The damper 37 is rotatably engaged to the fan inlet 35 to cover all or a portion of the fan inlet 35. The damper 37 controls the amount of heat generated within the gasification chamber 6 and the gas combustion chamber 8. The gasifier combustor of the present invention permits controlled burning of the biomass. The rate of burning is controlled by adjusting the damper 37 on the intake of the pressure blower 34. Opening the damper will increase the suction pressure on the gasifier combustor and consequently increase the primary and secondary air rates. The increase in primary air will increase the rate of biomass conversion and consequently the rate of heat generation. Closing the damper will have an opposite effect.

In operation, the biomass gasifier combustor 2, appearing in FIG. 1, produces a clean combustion gas which can be used directly for grain drying without the need for a heat exchanger to isolate the combustion gases from the drying air. The biomass, which includes materials such as corn stalks, corn cobs, corn grain, wood chips, or other biomasses is placed in the hopper 16 so that the biomass may be engaged by the blades of the screw feeder 14. When the biomass is engaged by the blades of the screw feeder 14, and as the screw feeder rotates in response to the action of the gear motor screw drive 12, the biomass is forced into the feeder tube 18 of the biomass feeder 4 and into the gasification chamber 6.

The venturi gas pump 10 creates a negative pressure region in the combustor 2 due to the operation of the pressure blower 34 in providing a continuous flow of forced air through the venturi gas pump 10. The negative pressure can be controlled through the use of damper 37 covering the fan inlet 35 of blower 34. Since the venturi gas pump 10 communicates with the internal gas combustion chamber 8, a negative pressure region is created in such a way as to cause the combustion gases present in the gas combustion chamber 8 to exit through an opening 38, eventually being exhausted to the atmosphere in the form of hot exhaust gases. Concurrently with and in response to the creation of the negative pressure region in the combustor 2 due to the action of the venturi gas pump 10, primary air enters the openings 17, and passes through the holes 22 and into the fire zone 20 of the gasification chamber 6. The biomass is present in the fire zone 20 when the primary air is forced through the holes 22.

Referring to FIG. 4, when the primary air is drawn through openings 17, in response to the negative pressure created by the venturi pump 10 (not shown), and when the primary air passes through the grate 13 and through the hot glowing coals 15, hot combustion gases are created as a result of the burning of the biomass in the combustion chamber 6. These hot combustion gases exit through the gas exit tube 24, and into the gas combustion chamber 8 in response to the creation of the negative pressure region within the combustor 2. An ash pan 19 collects the ashes of the hot glowing coals 15.

Secondary air is drawn through the secondary air inlet 26, in response to the creation of the negative pressure in the gas combustion chamber 8. The secondary air combines with the hot combustion gases in the gas combustion chamber 8. The reaction of the hot combustion gases with the secondary air in the gas combustion chamber 8 causes the hot combustion gases present in the gas combustion chamber 8 to undergo a complete combustion, or a secondary combustion, which oxidizes all the combustibles present in the hot combustion gas. An intense heat is created in the secondary gas combustion chamber 8, typically, 1700° F., and $CO_2$ and $H_2O$, the products of combustion, are exhausted to the atmosphere by exiting through the opening 38. The venturi gas pump 10 carries and exhausts the hot exhaust gases ($CO_2$, $H_2O$, $N_2$ and $O_2$), which are the product of the secondary combustion occurring within the gas combustion chamber 8. These hot exhaust gases are sufficiently clean such that they can be used directly for grain drying without the need for a heat exchanger to isolate the hot exhaust gases from the drying air.

Note that refractory insulation exists between the gasification chamber 6 and the secondary combustion chamber 8. This reduces the amount of heat which is transferred from the secondary combustion chamber 8 to the gasification chamber 6.

Referring to FIG. 5, an automatic control of biomass feeding into the gasification zone is disclosed. The screw feeder 14 feeds the biomass into the gasification chamber 6. A paddle 21 is rotated in response to the action of its controller 23. As the screw feeder feeds the biomass into the gasification chamber 6, the biomass accumulates and eventually interrupts the rotation of the paddle 21. When the paddle rotation is interrupted, a micro switch in the controller 23 is triggered which feeds a controller signal back to the gear motor drive screw 12 to prevent rotation of the screw feeder 14. Consequently, the rotation of the screw feeder 14 terminates, and the biomass is no longer forced into the gasification chamber 6. As burning proceeds in the gasification chamber 6, the level of the biomass in the gasification chamber drops. This drop in the level of the biomass in the gasification chamber acts to release the paddle 21 and rotation of the paddle once again commences. The micro switch in the controller 23 is released, releasing the gear motor drive screw 12, and commencing rotation of the screw feeder 14. Biomass is then forced back into the gasification chamber 6 for subsequent combustion.

Figure 6:
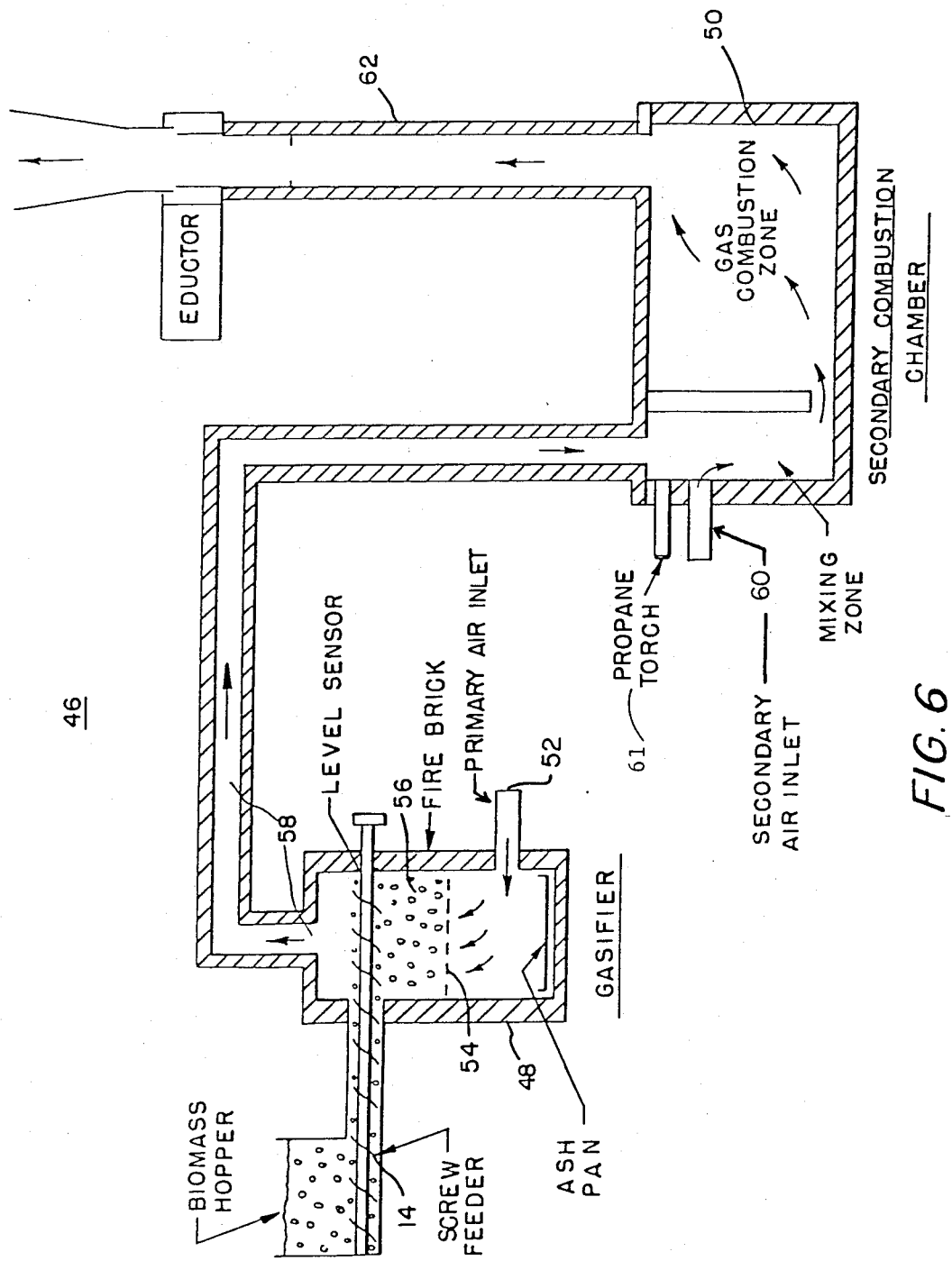
FIG. 6 is a sectional view of an alternate embodiment of the biomass gasifier combustor of the present invention.

Referring to FIG. 6, an alternate embodiment of the present invention is illustrated. The biomass gasifier combustor 46 in FIG. 6 depicts a primary combustion chamber 48 and a secondary combustion chamber 50. The screw feeder rotates, as in the previous embodiment, and forces the biomass into the primary combustion chamber. Primary air is drawn into the primary combustion chamber through the primary air inlet 52. This primary air gasifies the biomass present within the primary combustion chamber. The biomass 56 undergoes a primary combustion in the primary combustion chamber to produce a low BTU gas. Primary combustion gases are released and drawn through a gas exit pipe 58 of a reduced diameter. The gas exit pipe 58 connects with the secondary combustion chamber 50. As the primary combustion gases enter the secondary combustion chamber, a propane torch 61 ignites the primary combustion gas upon start up when the secondary combustion chamber is cold. After starting and the secondary combustion chamber is hot, the ignition of the gas and secondary air are self-sustaining and the igniter 61 is not necessary. The primary combustion gases mix with the secondary air being drawn into the secondary air inlet 60. When the primary combustion gas is mixed with the secondary air in the secondary combustion chamber 50, a secondary combustion of the primary combustion gases takes place, thereby producing a clean secondary gas consisting of primarily $CO_2$, $H_2O$, $O_2$ and $N_2$. Sufficient time, temperature and turbulence is caused as a result of the secondary combustion within the secondary combustion chamber 50 in order to completely oxidize the organics present in the primary combustion gas thereby producing the secondary combustion gas in the form of $CO_2$, $H_2O$, $O_2$ and $N_2$. Since the secondary air is being drawn into the secondary air inlet 60, the secondary combustion gases exit through the exhaust stack 62 and to the atmosphere. The secondary combustion gas (exhaust) is drawn through the secondary combustion chamber by the negative pressure generated by the eductor which performs a function identical to the venturi pump 10 in FIG. 1. Thus, only an exhaust pump, in this case the eductor, is used to pull hot gases from the present system and simultaneously pull both the primary and secondary air into the system. This works because the resistance to the flow of gases through the gasifier is very small.

Figure 7A:
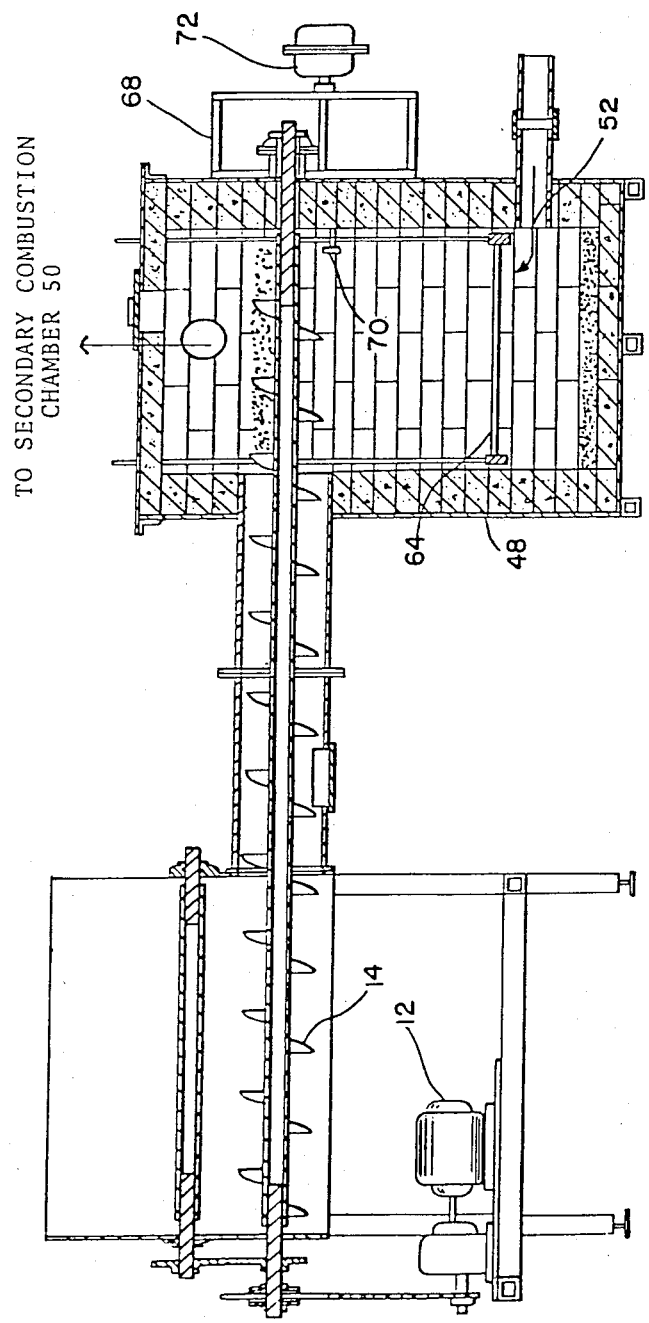
FIG. 7A is a detailed view of the primary combustion chamber and associated peripheral equipment for the biomass gasifier combustor of FIG. 6.
Figure 7B:
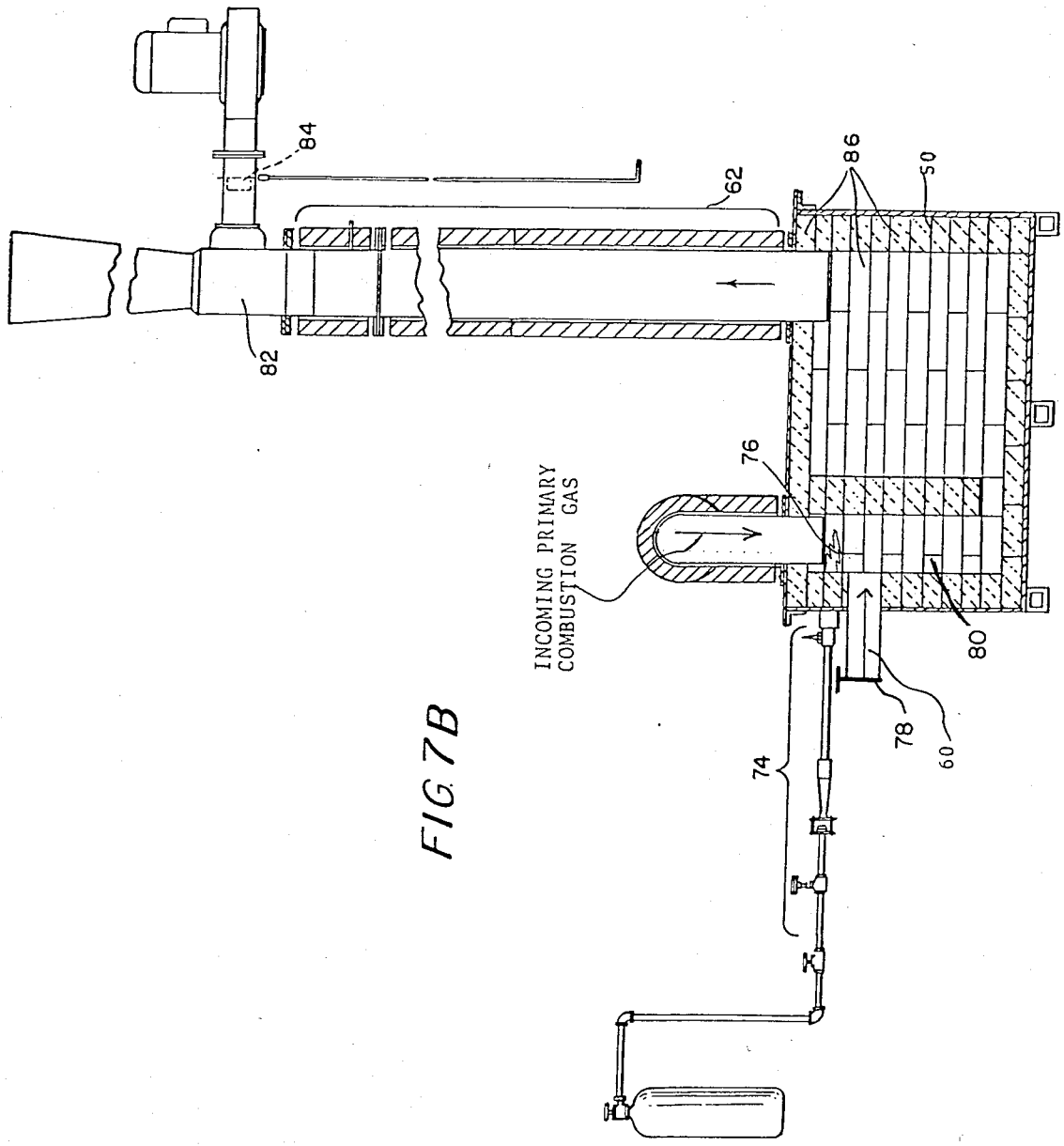
FIG. 7B is a detailed view of the secondary combustion chamber and associated peripheral equipment for the biomass gasifier combustor of FIG. 6.

A more thorough understanding of the alternative embodiment appearing in FIG. 6 may be obtained from the illustrations in FIGS. 7A and 7B. In FIG. 7A, the primary combustion chamber and its associated peripheral equipment is shown. The screw feeder 14 forces the biomass into the primary combustion chamber 48. The gear motor drive screw 12 drives the screw feeder in forcing the biomass into the primary combustion chamber. A variable height grate 64 is illustrated wherein the biomass is placed thereon. The primary air is introduced through the primary air inlet 52 into primary combustion chamber 48. A controller 68 is shown which maintains a constant level of biomass in the primary combustion chamber 48. This controller 68 maintains the constant level of biomass in the primary combustion chamber by monitoring the rotational conditions of the paddle 70. When the biomass in the gasifier reaches a predetermined level, the paddle 70 is prevented from rotating. A micro switch in the controller housing 72 is activated or triggered as a result of the termination of the rotation of paddle 70. The activation of the micro switch in the controller housing 72 deenergizes the gear motor drive screw 12 such that the screw feeder 14 stops rotating. As a result, the biomass then is no longer forced into the primary combustion chamber 48.

The variable height grate 64 controls the temperature of the primary combustion gas exiting the gasifier 48. In the case of the gasification of corn cobs, the temperature of the primary air flowing up through the biomass will drop from approximately 2200° F. at the grate 64 to approximately 570° F. at the screw feeder 14. As a result of this drop in temperature, a steel screw feeder 14 can be used for the feeder screw in forcing the biomass into the primary combustion chamber. Thus, it is no longer necessary to utilize expensive alloys high in chrome and nickle as materials for the screw feeder 14 to withstand high temperatures. This temperature drop realized is fuel dependent, and the temperature drop experienced will vary from fuel to fuel. Also, various properties such as particle size, moisture of the fuel, etc. will make a difference.

Referring to FIG. 7B, the secondary combustion chamber 50 and its associated peripheral equipment is shown. An igniter 74 is illustrated for the purpose of maintaining a flame 76 in the mixing zone to prevent gas explosions during start up and to add stability when the gas temperature falls below 1200–1400° F. A secondary air inlet 60 is shown which directs the excess secondary air into the secondary combustion chamber 50. Excess secondary air is needed to complete the combustion of the primary combustion gas in the secondary combustion chamber and is used to keep temperatures in the secondary combustion chamber lower than the temperature limit of the materials used in construction of the secondary combustion chamber.

The secondary air inlet 60 further includes a damper 78 which controls the amount of excess air being drawn into the secondary combustion chamber. The incoming primary combustion gas from the primary combustion chamber is mixed with the incoming secondary air being pumped into the secondary air inlet 60 in the mixing zone 80. The mixing zone 80 provides the necessary turbulence to thoroughly mix the incoming secondary air with the incoming primary combustion gas. Thorough mixing of the incoming secondary air and the incoming primary combustion gas enhances the complete combustion of the combustibles present in the primary combustion gas and provides for a clean exhaust consisting primarily of $CO_2$, $H_2O$, $O_2$ and $N_2$.

The eductor exhaust pump 82, located at the top portion of the exhaust stack 62, creates a negative pressure region in the secondary combustion chamber and functions as the venturi pump of FIG. 1. By regulating the rate at which the exhaust is pulled through the system in the eductor 82, the rate of burning and consequently the thermal output is also regulated. A damper 84 regulates the rate at which the exhaust is pulled through the exhaust stack 62 from the system. The damper 84 also regulates the thermal output of the system.

In the secondary combustion chamber 50, the secondary combustion gas is produced in response to the mixture of the incoming secondary air and the incoming primary combustion gas, and in response to the resultant combustion of the incoming primary combustion gas. The secondary combustion chamber 50 provides a zone with sufficient time, temperature and turbulence to completely oxidize the combustibles present in the incoming primary combustion gas. Consequently, the exhaust from the second combustion chamber includes primarily $CO_2$, $H_2O$, $O_2$ and $N_2$. The refractory insulation 86 in insulating the secondary combustion chamber, maintains the temperature in the secondary combustion chamber at a high level such that chemical reactions will proceed to completion in a short time. No heat is extracted from the secondary combustion gas or exhaust gases until the organics present have been completely oxidized. Some heat is lost by conduction through the walls of the apparatus.

Some of the typical applications for use of the present invention include grain drying, tobacco curing, disposal of peanut shells, disposal of woodchips and use of a thermal energy for kiln drying, and utilization of heat for drying and disposal of wastes to generate boiler steam.

The gasification chamber of the present invention does not require a mechanical seal since the screw feeder tube 18 together with the screw feeder 14 functions as a partial seal at the feed end of the gasifier. In addition, the biomass is horizontally forced into the fire zone by a mechanical force (the action of the screw feeder 14) instead of the conventional gravity feed. As a result, the present invention enables the biomass to be gasified in a uniform fire bed which results in uniform burning. The biomass gasifier combustor 2 of the present invention produces a clean combustion gas which can be used directly for grain drying without the need for a heat exchanger to isolate the combustion gases from the drying air.

The invention being thus described, it will be obvious that the same may be varied in many ways. Such variations are not to be regarded as a departure from the spirit and scope of the invention, and all such modifications as would be obvious to one skilled in the art, are intended to be included within the scope of the following claims.

What is claimed is:

1. An apparatus for producing a clean combustion gas in response to combustion of a biomass mixture disposed therein and for drying an object using said clean combustion gas, which comprises in combination:

a screw feeder means for feeding said biomass mixture into said apparatus, said feeder means being horizontally disposed for feeding said biomass mixture into said apparatus along a horizontal direction and having an augered configuration for forcedly feeding said biomass mixture into said apparatus;

a first combustion chamber means for receiving said biomass mixture from said feeder means and burning said biomass mixture therein thereby producing a first combustion gas, said feeder means extending transversely within said first combustion chamber means for levelling the biomass mixture received therein, said feeder means being horizontally disposed in a plane within said first combustion chamber means, said plane substantially corresponding to the maximum desired level of said biomass mixture in said first combustion chamber means, said feeder means sealing said first combustion chamber means from said atmosphere;

a level sensing means extending into said first combustion chamber means and connected to said feeder means for sensing the level of the biomass mixture in said first combustion chamber and for terminating the feed of said screw feeder means when said biomass mixture reaches a predetermined level;

a second combustion chamber means for receiving said first combustion gas and burning said first combustion gas therein thereby producing a second combustion gas;

means for directing said first combustion gas into said second combustion chamber, said means having a cross-sectional area such that the orifice passage resistance to the air passing from said first combustion chamber to said second combustion chamber is increased permitting sufficient secondary air to be pulled into said second combustion chamber;

a nozzle means for forcedly directing said second combustion gas from said second combustion chamber means onto said object, said second combustion gas drying said object;

pump means communicating with said second combustion chamber means for creating a negative pressure region within said apparatus, said negative pressure region drawing said first combustion gas into said second combustion chamber means and forcedly directing said second combustion gas through said nozzle means and onto said objects;

said biomass mixture comprises a highly porous fuel having a low moisture content;

means for producing a primary flow of air into said first combustion chamber means;

primary air inlet port means responsive to said means for producing said primary flow of air into said first combustion chamber means, the primary air flowing from said primary inlet port means through the porous fuel in said first combustion chamber means thereby burning the porous biomass mixture therein;

first gas outlet port means for permitting said first combustion gas to exit from said first combustion chamber means to said second combustion chamber means;

whereby the level sensing means stops the feed of said screw feeder means when the biomass mixture in said first combustion chamber has reached a predetermined level, an even biomass distribution being achieved in said first combustion chamber means when the biomass mixture is levelled thereby permitting an even burn of said biomass in said first combustion chamber means.

2. An apparatus in accordance with claim 1, wherein said second combustion chamber means further comprises:

secondary air inlet port means for permitting a secondary flow of air to flow into said second combustion chamber means; and second gas outlet port means for permitting said second combustion gas to exit from said second combustion chamber means to said nozzle means.

3. An apparatus in accordance with claim 2, further comprising means connected to said secondary air inlet port means for regulating the amount and the flow rate of said secondary flow of air into said second combustion chamber.

4. An apparatus in accordance with claim 1 further comprising regulating means associated with said nozzle means for regulating the rate of flow of said second combustion gas through said nozzle means thereby regulating the output temperature of said second combustion gas being directed onto said object.

5. An apparatus in accordance with claim 1, wherein said first combustion chamber means further comprises ash port means for permitting the burned biomass mixture in said first combustion chamber means to fall from said first combustion chamber means into an ash collection chamber means.

* * * * *